United States Patent
Gao

(10) Patent No.: US 9,122,448 B2
(45) Date of Patent: Sep. 1, 2015

(54) ELECTRONIC APPARATUS

(71) Applicants: Beijing Lenovo Software Ltd., Haidian District, Beijing (CN); Lenovo (Beijing) Co., Ltd., Haidian District, Beijing (CN)

(72) Inventor: Rong Gao, Beijing (CN)

(73) Assignees: BEIJING LENOVO SOFTWARE LTD., Beijing (CN); LEVONO (BEIJING) CO., LTD., Beijing (CN)

( * ) Notice: Subject to any disclaimer, the term of this patent is extended or adjusted under 35 U.S.C. 154(b) by 73 days.

(21) Appl. No.: 14/178,890

(22) Filed: Feb. 12, 2014

(65) Prior Publication Data

US 2014/0368990 A1    Dec. 18, 2014

(30) Foreign Application Priority Data

Jun. 14, 2013    (CN) .......................... 2013 1 0234997

(51) Int. Cl.
*G06F 1/16* (2006.01)
*G06F 3/02* (2006.01)

(52) U.S. Cl.
CPC ............ *G06F 1/1632* (2013.01); *G06F 1/1626* (2013.01); *G06F 1/1654* (2013.01); *G06F 3/0202* (2013.01)

(58) Field of Classification Search
CPC .............................. G06F 1/1632; G06F 1/1654
USPC ............. 361/679.01–679.45, 679.55–679.59; 345/156, 157, 168, 169, 905; 312/223.1, 223.2; 206/320
See application file for complete search history.

(56) References Cited

U.S. PATENT DOCUMENTS

| | | | |
|---|---|---|---|
| 6,937,468 B2 * | 8/2005 | Lin et al. | 361/679.41 |
| 6,980,420 B2 * | 12/2005 | Maskatia et al. | 361/679.57 |
| 8,599,542 B1 * | 12/2013 | Healey et al. | 361/679.17 |
| 8,817,457 B1 * | 8/2014 | Colby et al. | 361/679.29 |
| 2004/0190234 A1 * | 9/2004 | Lin et al. | 361/681 |
| 2011/0292584 A1 * | 12/2011 | Hung et al. | 361/679.26 |
| 2012/0243149 A1 * | 9/2012 | Gartrell et al. | 361/679.01 |
| 2013/0170126 A1 * | 7/2013 | Lee | 361/679.17 |

* cited by examiner

*Primary Examiner* — Nidhi Thaker
(74) *Attorney, Agent, or Firm* — Brinks Gilson & Lione; G. Peter Nichols

(57) ABSTRACT

An electronic apparatus includes a first main body and a second main body. The first main body includes a first surface and a second surface opposite the first surface. The second main body includes a base, a first fixing block and a second fixing block each protrusively arranged on the base and opposite to each other. When the first main body is inserted into the second main body with the first surface facing the second main body, a first end of the first main body is clamped between the first fixing block and the base and is supported by the second fixing block. When the first main body is inserted into the second main body with the second surface facing the second main body, the first end is clamped between the second fixing block and the base and is supported by the first fixing block.

5 Claims, 3 Drawing Sheets

ELECTRONIC APPARATUS

BACKGROUND

This application claims priority to Chinese patent application No. 201310234997.2 filed on Jun. 14, 2013, the entire contents of which are incorporated herein by reference.

The present application relates to the electronic technology field, and more particularly, to an electronic apparatus.

Along with a constant development of science and technology, electronic apparatus has made great progress. With more and more types of electronic products, people have enjoyed conveniences brought by the scientific development. Now, people can enjoy comfortable life brought by technological development through various electronic apparatuses. For example, after emergence of the tablet PC, the laptop of traditional structure is replaced gradually. Certainly, the existing laptop can realize a rotation of 360 degrees, but cannot be used conveniently and quickly as the tablet PC.

When massive online game is played on the tablet PC or a lot of text messages are input via the virtual keyboard on the tablet PC, the tablet PC is inconvenient. In the prior art, the tablet PC can be inserted into a keyboard with a slot so as to realize functions of providing an input device to the tablet PC and supporting the tablet PC.

In the process of realizing above technical solutions, the inventor finds that the above technology at least has technical problems below:

In the prior art, when the tablet PC is inserted into the slot on the keyboard, the display unit of the tablet PC is inserted only facing the keyboard surface, so a technical problem of immobilization of the slot structure on the keyboard appears, thereby causing a problem of inflexibility during a user's operation.

SUMMARY

By providing an electronic apparatus in the embodiments of the present application the technical problem of immobilization of the slot structure on the keyboard is solved in a case that the display unit of the tablet PC is inserted only facing the keyboard surface when the tablet PC is inserted into the slot on the keyboard in the prior art, and a technical effect of a flexible slot structure is achieved through which the user can insert the tablet PC into the slot of the keyboard in different manners flexibly.

The embodiment of the present application provides an electronic apparatus, which comprises a first main body and a second main body, the first main body includes a first surface and a second surface having its back towards a back of the first surface, the second main body includes: a base; a first fixing block being arranged on the base protrusively; and a second fixing block being protruded on the base and disposed opposite to the first fixing block; wherein, when the first main body is inserted into the second main body in a manner that the first surface of the first main body faces the second main body, a first end of the first main body is clamped between the first fixing block and the base and is supported by the second fixing block; and when the first main body is inserted into the second main body in a manner that the second surface of the first main body faces the second main body, the first end of the first main body is clamped between the second fixing block and the base and is supported by the first fixing block.

Further, the second main body further comprises: a first supporting element, which is arranged on the second fixing block, when the first end of the first main body is clamped between the first fixing block and the base, the first supporting element and the second fixing block support the first main body together, in order to prevent continuous slant of the first main body relative to the second main body.

Further, a first included angle is formed between the base and the first fixing block; a second included angle is formed between the base and the second fixing block; and the first included angle and the second included angle are acute angles.

Further, after the first end is inserted into the first included angle or the second included angle, the first end is in a fixing state.

Further, a first interface for electric connection is arranged on the base; a second interface for electric connection is arranged at a position in a first side of the first main body which corresponds to the first interface; when the first main body is inserted into the second main body, the first interface and the second interface are mutually aligned, to achieve the electric connection or data transmission between the first main body and the second main body.

Further, the first interface or the second interface is specifically a USB interface or IEEE 1394 interface.

The embodiments of the present application provide one or more technical solutions, which have at least the following technical effects or advantages:

1. Since the first fixing block and the second fixing block are arranged on the base of the main body where the keyboard is located, the other main body can be inserted between the first fixing block and the base in a manner that the first surface of the other main body faces the surface where the keyboard is located, and the other main body can be supported by the second fixing block, or the other main body can be inserted between the second fixing block and the base in a manner that the second surface of the other main body faces the surface where the keyboard is located, and the other main body can be supported by the first fixing block, it effectively solves the technical problem of immobilization of the slot structure on the keyboard in a case that the display surface of the tablet PC is inserted only in a manner of facing the keyboard surface when the tablet PC is inserted into the slot in the prior art, and the problem of inflexibility during a user's operation, and it achieves a technical effect of a flexible slot structure, through which the user can insert the tablet PC into the slot of the keyboard in different manners flexibly.

2. Since the first fixing block and the second fixing block are arranged on the base of the main body where the keyboard is located, the first included angle is formed between the first fixing block and the base and the second included angle is formed between the second fixing block and the base, and the first included angle and the second included angle are acute angles, a technical effect of steadily fixing the tablet PC on the main body where the keyboard is located is achieved.

3. Since the first interface for electric connection is arranged on the base, the second interface for electric connection is arranged at a position corresponding to the first interface in a first side of the tablet PC, when the tablet PC is inserted into the main body where the keyboard is located, the first interface and the second interface are mutually aligned, a power supply connection or data transmission connection between the tablet PC and the main body where the keyboard is located are realized, the technical effect of data communication is achieved.

DETAILED DESCRIPTION

By providing an electronic apparatus in the embodiments of the present application, the technical problem is solved which is immobilization of the slot structure on the keyboard in a case that the display unit of the tablet PC is inserted only facing the keyboard surface when the tablet PC is inserted into the slot of the keyboard in the prior art, the technical effects are achieved which are that the tablet PC can be forwardly or reversely inserted into the slot where the keyboard is located, which further improving the user experience.

The overall concept of the technical solution of the present application is for solving the technical problems of immobility and inflexibility of the slot structure of the main body where the slot is located, which is as follows:

Firstly, the present application can improve a slot of an expanding dock, so that the other main body can be correspondingly inserted into the slot. The present application provides an electronic apparatus, which comprises a first main body and a second main body; the first main body includes a first surface and a second surface having its back towards a back of the first surface; the second main body includes a base, a fixing block and a second fixing block; the two fixing blocks are fixed on the base and disposed opposite to each other. When one main body needs to be inserted into the slot, firstly, when the first surface of the main body faces the surface of the expanding dock, i.e., facing towards the keyboard surface, a first end of the main body is clamped between the first fixing block and the base and is supported by the second fixing block; secondly, when the first surface of the main body has its back towards the surface of the expanding dock, i.e., facing against the keyboard surface, the first end of the main body is clamped between the second fixing block and the base and is supported by the first fixing block, so the technical effect of inserting the main body into the slot forwardly and reversely is achieved.

In order to better understand the above technical solution, the above technical solution is explained in detail in conjunction with the drawings of the specification and the detailed embodiments.

Figure 1:
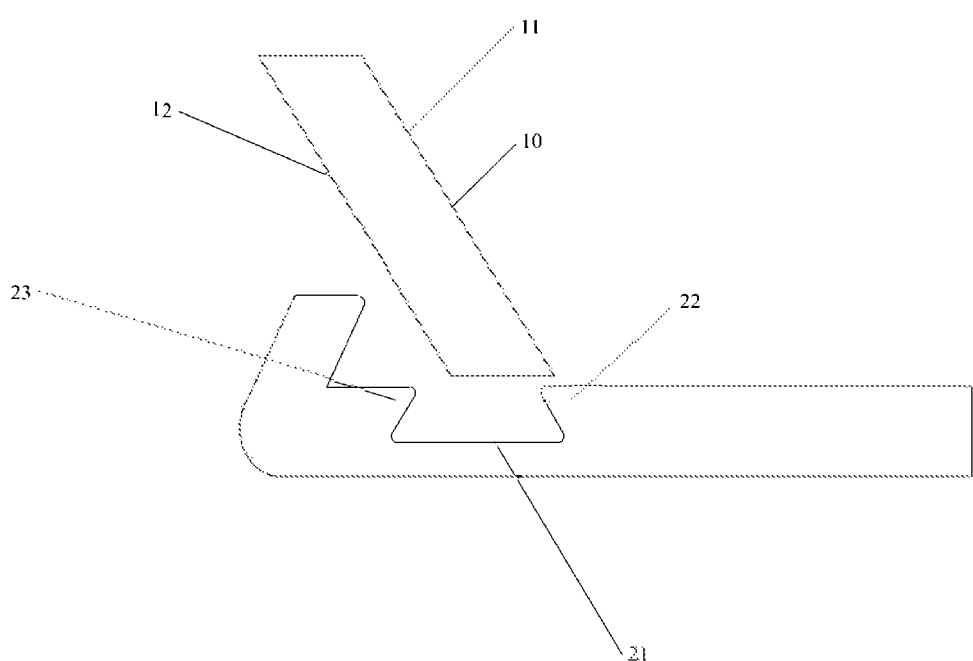
FIG. 1 is a structural schematic diagram of an electronic apparatus in the embodiments of the present application.

The present application provides an electronic apparatus, as shown in FIG. 1, comprising: a first main body 10, including a first surface 11 and a second surface 12 having its back towards a back of the first surface; and a second main body 20, including a base 21, a first fixing block 22 being arranged on the base 21 protrusively and a second fixing block 23 being arranged on the base 21 protrusively and opposite to the first fixing block 22.

Figure 2A:
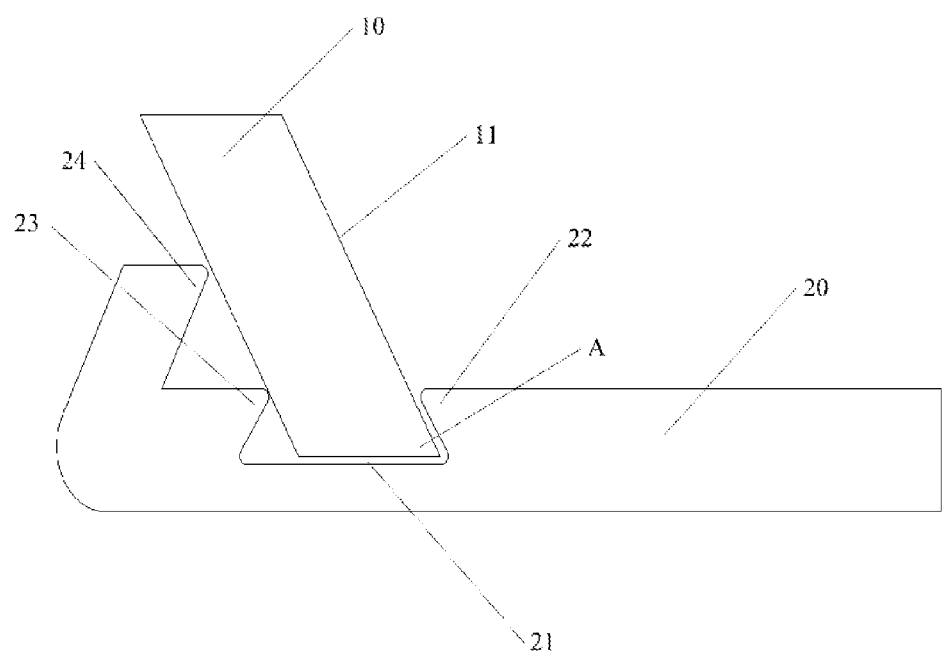
FIG. 2a is a structural schematic diagram of the first main body forwardly inserted into the second main body in the embodiment of the present application.
Figure 2B:
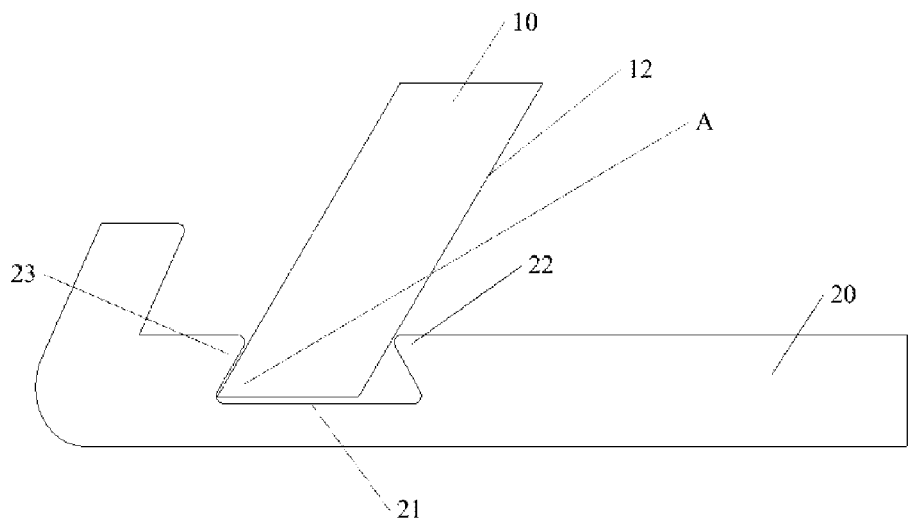
FIG. 2b is a structural schematic diagram of the first main body reversely inserted into the second main body in the embodiment of the present application.

As shown in FIG. 2a, when the first main body 10 is inserted into the second main body 20 in a manner that the first surface of the first main body 10 faces the second main body, a first end A of the first main body is clamped between the first fixing block 22 and the base 21 and is supported by the second fixing block 23. As shown in FIG. 2b, when the first main body 10 is inserted into the second main body 20 in a manner that the second surface 12 of the first main body 10 faces the second main body 20, the first end A of the first main body 10 is clamped between the second fixing block 23 and the base 21 and is supported by the first fixing block 22.

In the actual realization, the first main body 10 may be a tablet PC; the surface having a display screen on the tablet PC is used as the first surface 11; the other surface back to the display screen is used as the second surface 12; the second main body 20 can be an expanding dock with a slot; certainly, there is no specific limitation in the embodiment of the application; the expanding dock is mainly used as an input device, namely, a keyboard. Other interfaces added on the expanding dock can be used for connecting many kinds of external apparatuses, such as driver, large-screen display, keyboard, printer, scanner and the like, which solves the problem that the portable tablet PC has few accessories; and the appearing of the expanding dock is convenient for usage.

It can be seen from FIG. 2a that the manner for inserting the tablet PC into the expanding dock belongs to forward insertion, so an angle formed by the display surface of the tablet PC (i.e., the first surface 11) and the keyboard surface is an obtuse angle; such a display effect of the tablet PC enables the user to have a better viewing effect. It can be seen from FIG. 2b that the manner for inserting the tablet PC into the expanding dock belongs to reverse insertion, so an angle formed by the surface having its back to the display surface of the tablet PC (i.e., the second surface 12) and the keyboard surface is an acute angle; the user can watch the images displayed on the tablet PC from a reverse direction, to achieve the effect the same as that of front insertion of the tablet PC.

Next, the fixing structure of forwardly inserting into the slot of the expanding dock and the fixing structure of reversely inserting into the slot of the expanding dock are respectively introduced.

Firstly, the case of forward insertion is introduced, as shown in FIG. 2a, there is a groove structure on the second main body 20; the groove structure is composed of two fixing blocks: the first fixing block 22 and the second fixing block 23, and a base 21, wherein the second main body 20 further comprises a first supporting element 24 arranged on the second fixing block 23; when the first main body 10 is clamped between the first fixing block 22 and the base 21, the first supporting element 24 and the second fixing block 23 support the first main body 10 together in order to prevent the continuous slant of the first main body 10 relative to the second main body 20.

When the first main body 10 is forwardly inserted into a first groove formed by the first fixing block 22 and the base 21, the first end A of the first main body 10 is inserted into the first groove, meanwhile, the second surface 12 of the first main body 10 is supported by the second fixing block 23 and the first supporting element 24, so that the first main body 10 forwardly inserted can be fixed on the expansion slot and form a best angle for the user's viewing.

Next, the case of reverse insertion is introduced, as shown in FIG. 2b, a second groove opposite to the first groove consists of the second fixing block 23 and the base 21; when the first main body 10 is reversely inserted, the first end A of the first main body 10 is inserted into the second groove, meanwhile, the second surface 12 of the first main body 10 is supported by the first fixing block 22.

When the first main body 10 forwardly or reversely inserted into the second main body 20 are introduced, the first groove and the second groove are introduced. It can be seen from the side views in FIG. 2a and FIG. 2b that a first included angle is formed between the base 21 and the first fixing block 22, a second included angle is formed between the base 21 and the second fixing block 23, and the first included angle and the second included angle are acute angles. After the first end A of the first main body 10 is inserted into the first included angle or the second included angle, the first end A can be in a fixing state. Moreover, the advantage of using acute angles is to steadily fix the first end A of the first main body without looseness.

In the present application, the first main body 10 can be forwardly and reversely fixed on the second main body 20; moreover, after the first main body 10 is fixedly connected with the second main body 20, the function of the second main body 20 for supplying power to the first main body 10 or data communication with the first main body 10 by the input apparatus of the second main body 20 can be realized.

Figure 3:
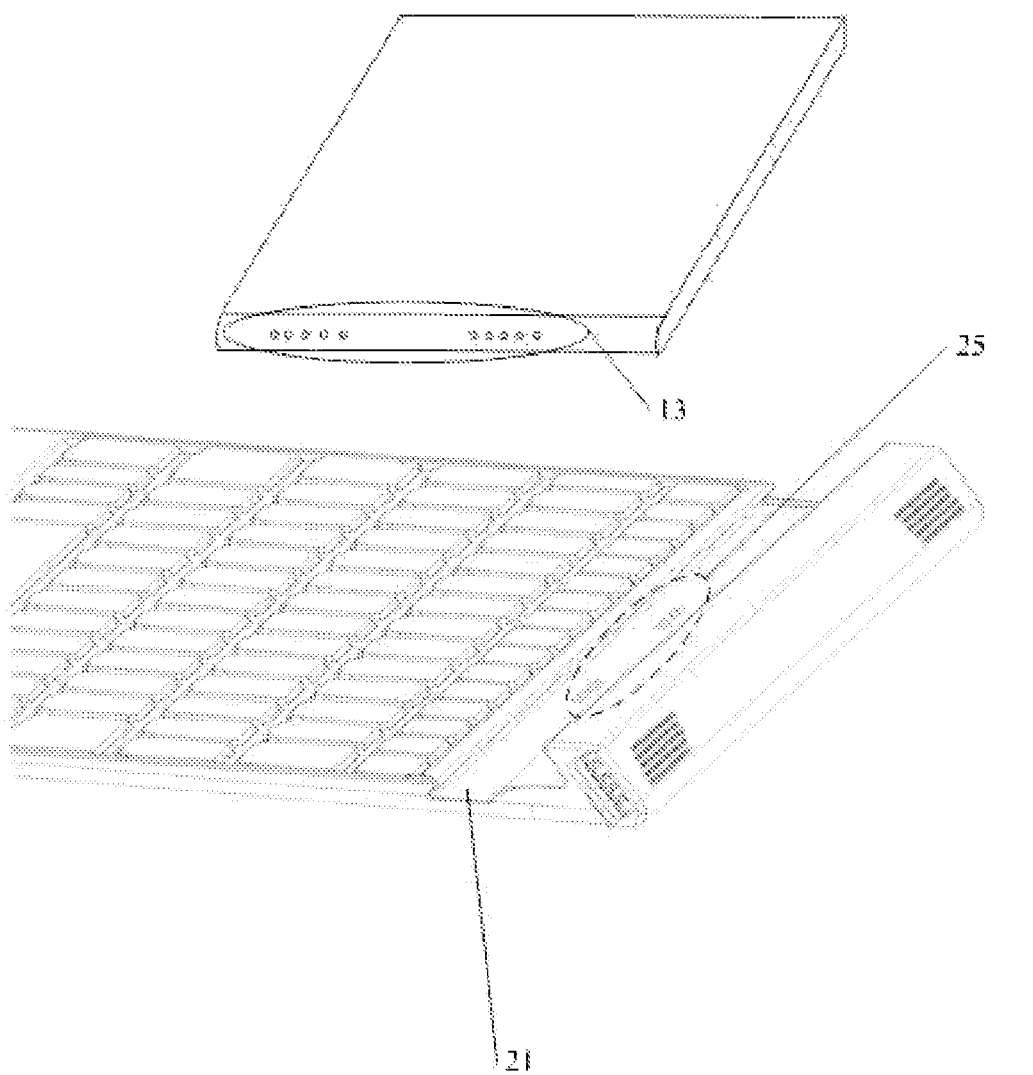
FIG. 3 is a structural schematic diagram of the first interface and the second interface in the embodiment of the present application.

As shown in FIG. 3, a first interface 25 for electric connection is set on the base 21; a second interface 13 for electric connection is arranged at a position corresponding to the first interface 25 in a first side of the first main body; when the first main body 10 is inserted into the second main body 20, the first interface 25 and the second interface 13 are mutually aligned, to achieve the electric connection or data transmission between the first main body 10 and the second main body 20.

In the actual implementation, the first interface 25 is arranged on the base in the groove and set as a raised structure; the second interface 13 the first main body 10 should be a sunken structure, and typically can be a USB interface or IEEE 1394 interface, etc. When the first interface 25 and the second interface 13 are mutually aligned and inserted, the electric connection or data transmission can be realized.

Of course, when the first main body 10 is forwardly or reversely inserted into the second main body 20, the first interface 25 and the second interface 13 correspond to each other, regardless of influence of the forward and reverse insertion.

The technical solution in the embodiments of the present application at least has the following technical effects or advantages:

1. Since the first fixing block and the second fixing block are arranged on the base of the main body where the keyboard is located, the other main body can be inserted between the first fixing block and the base in a manner that the first surface of the other main body faces the surface where the keyboard is located, and the other main body can be supported by the second fixing block, or the other main body can be inserted between the second fixing block and the base in a manner that the second surface of the other main body faces the surface where the keyboard is located, and the other main body can be supported by the first fixing block, it effectively solves the technical problem of immobilization of the slot structure on the keyboard in a case that the display surface of the tablet PC is inserted only in a manner of facing the keyboard surface when the tablet PC is inserted into the slot in the prior art, and the problem of inflexibility during a user's operation, and it achieves a technical effect of a flexible slot structure, through which the user can insert the tablet PC into the slot of the keyboard in different manners flexibly.

2. Since the first fixing block and the second fixing block are arranged on the base of the main body where the keyboard is located, the first included angle is formed between the first fixing block and the base and the second included angle is formed between the second fixing block and the base, and the first included angle and the second included angle are acute angles, a technical effect of steadily fixing the tablet PC on the main body where the keyboard is located is achieved.

3. Since the first interface for electric connection is arranged on the base, the second interface for electric connection is arranged at a position corresponding to the first interface in a first side of the tablet PC, when the tablet PC is inserted into the main body where the keyboard is located, the first interface and the second interface are mutually aligned, a power supply connection or data transmission connection between the tablet PC and the main body where the keyboard is located are realized, the technical effect of data communication is achieved.

Although the preferred embodiments of the present application have been described, a person of skill in the art can make other alteration and modification for these embodiments once learning about the basic inventive concept. Thus, the appended claims are intended to include the preferred embodiments and all the alterations and modifications that fall into the scope of the invention.

It is evident that one person skilled in the art can make various changes or modifications to the present application without departure from the spirit and scope of the invention. Thus, if these changes and modifications to the present application are within the scope of the claims of the present application and equivalent technologies, the present application also intends to include all such changes and modifications.

The invention claimed is:

1. An electronic apparatus, comprising: a first main body, including a first surface comprising a display and a second surface opposite the first surface; a second main body, including: a base; a first fixing block protrusively arranged on the base; and a second fixing block protrusively arranged on the base and disposed opposite to the first fixing block;

wherein, when the first main body is inserted into the second main body in a manner that the first surface of the first main body faces the second main body, a first end of the first main body is clamped between the first fixing block and the base and is supported by the second fixing block; and when the first main body is inserted into the second main body in a manner that the second surface of the first main body faces the second main body, the first end of the first main body is clamped between the second fixing block and the base and is supported by the first fixing block;

wherein, a first included angle is formed between the base and the first fixing block, a second included angle is formed between the base and the second fixing block, and the first included angle and the second included angle are acute angles.

2. The electronic apparatus according to claim 1, wherein, the second main body further comprises a first supporting element arranged on the second fixing block and when the first end of the first main body is clamped between the first fixing block and the base, the first supporting element and the second fixing block support the first main body together to prevent continuous slant of the first main body relative to the second main body.

3. The electronic apparatus according to claim 1, wherein, after the first end is inserted into one of the first included angle and the second included angle, the first end is in a fixed position.

4. The electronic apparatus according to claim 1, wherein, a first interface for electric connection is arranged on the base, a second interface for electric connection is arranged at a position corresponding to the first interface in a first side of the first main body, such that when the first main body is inserted into the second main body, the first interface and the second interface are mutually aligned, electric connection or data transmission between the first main body and the second main body is achieved.

5. The electronic apparatus according to claim 4, wherein, the first interface or the second interface is a USB interface or IEEE1394 interface.

* * * * *